US012711223B2

(12) United States Patent
Seck et al.

(10) Patent No.: US 12,711,223 B2
(45) Date of Patent: Aug. 18, 2026

(54) BUILDING AND PROVIDING A REMEDIATION LIBRARY FOR CLOUD-BASED APPLICATIONS

(71) Applicant: Capital One Services, LLC, McLean, VA (US)

(72) Inventors: Mohamed Seck, Aubrey, TX (US); Krystan R. Franzen, Mechanicsville, VA (US)

(73) Assignee: Capital One Services, LLC, McLean, VA (US)

( * ) Notice: Subject to any disclaimer, the term of this patent is extended or adjusted under 35 U.S.C. 154(b) by 388 days.

(21) Appl. No.: 18/358,670

(22) Filed: Jul. 25, 2023

(65) Prior Publication Data

US 2025/0036758 A1 Jan. 30, 2025

(51) Int. Cl.
*G06F 21/55* (2013.01)

(52) U.S. Cl.
CPC ...... *G06F 21/554* (2013.01); *G06F 2221/034* (2013.01)

(58) Field of Classification Search
CPC ............. G06F 21/554; G06F 2221/034; G06F 21/577; G06N 20/00; H04L 63/1433
See application file for complete search history.

(56) References Cited

U.S. PATENT DOCUMENTS 11,669,621 B2 * 6/2023 Ahmed .................. G06N 20/00 726/25
12,265,631 B1 * 4/2025 Singh .................... G06F 21/577
2019/0245879 A1 * 8/2019 Ward .................. H04L 63/0236
2023/0026385 A1 * 1/2023 Zhang .................. G06F 21/577
2023/0064373 A1 3/2023 Starr
2023/0120174 A1 4/2023 Seck et al.

(Continued)

FOREIGN PATENT DOCUMENTS

JP 2025060512 A * 4/2025
WO WO-2022093250 A1 * 5/2022 ............... G06F 8/36
WO WO-2023283357 A1 * 1/2023 .......... G06F 11/3604

OTHER PUBLICATIONS

Machine translation of Son, JP 2025-060512 A, 6 pages (Year: 2025).*

(Continued)

*Primary Examiner* — Christopher A Revak
(74) *Attorney, Agent, or Firm* — Harrity & Harrity, LLP

(57) ABSTRACT

In some implementations, a remediation engine may receive an indication of a current instance of a security vulnerability associated with a cloud-based application. The remediation engine may determine, using a first machine learning model, a previous ticket associated with resolving a previous instance of the security vulnerability. The remediation engine may generate, using a second machine learning model, an automated script associated with resolving the security vulnerability. The remediation engine may transmit instructions for a user interface (UI) indicating the current instance of the security vulnerability. The remediation engine may receive an indication of an interaction with the UI. The remediation engine may transmit instructions for an overlay, indicating the previous ticket and the automated script, in response to the indication of the interaction with the UI.

20 Claims, 15 Drawing Sheets

(56) References Cited

U.S. PATENT DOCUMENTS

2023/0208871 A1* 6/2023 Yellapragada ......... G06N 3/045 726/25
2024/0135001 A1* 4/2024 Madala ................. G06F 21/577
2024/0193277 A1* 6/2024 Manuel-Devadoss ....................... G06F 21/577
2025/0159012 A1* 5/2025 Iwan ................... H04L 63/1433
2025/0272408 A1* 8/2025 Pickens ................. G06F 21/577

OTHER PUBLICATIONS

Extended European Search Report for European Application No. EP24190217 dated Dec. 10, 2024, 7 pages.

* cited by examiner

Figure 1E:
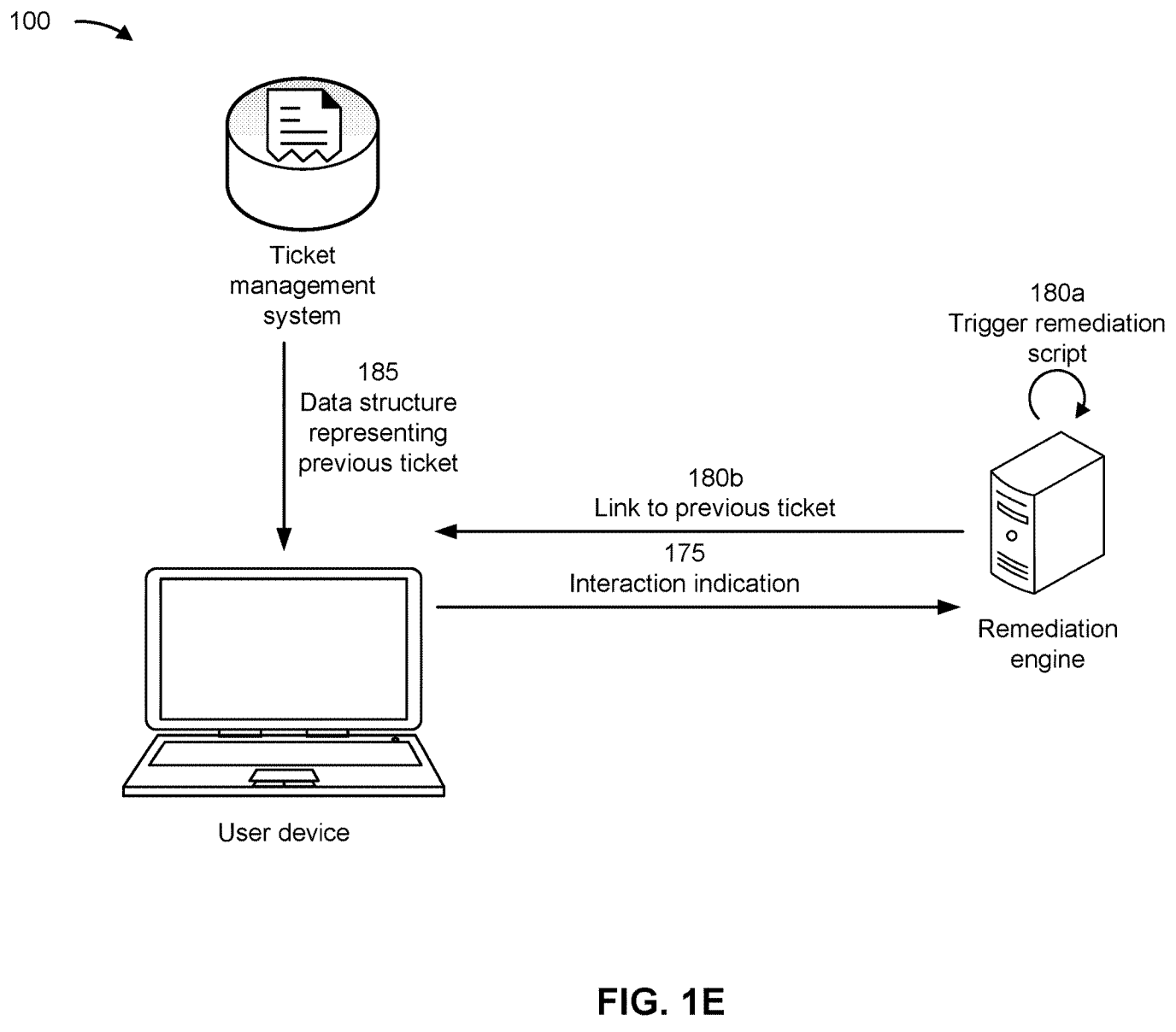

100

Ticket management system

185
Data structure representing previous ticket

User device

180a
Trigger remediation script

Remediation engine

180b
Link to previous ticket

175
Interaction indication

| ID | Vulnerability Title | Count | Percent (%) | Severity | Remediation |
|---|---|---|---|---|---|
| 105936 | OpenSSH Command Injection Vulnerability | 3 | 100 | Medium | YES |
| 375326 | Apache Cassandra RMI Rebind Vulnerability | 1 | 33 | Low | YES |
| 375593 | Docker Engine Denial of Service Vulnerability | 2 | 67 | Low | YES |

350

400

| | ID | TITLE | SOLUTION |
|---|---|---|---|
| 405 | 678316 | Red Hat | Yes |
| 410 | 353147 | Amazon Linux Security Advisory | No |
| 415 | 353148 | Checkmarx Issue | Yes |
| 420 | 353149 | Amazon Linux Security Advisory | Yes |

FIG. 4

| ID | Vulnerability Title | Count | Percent (%) | Servitiy | Context |
|---|---|---|---|---|---|
| 105936 | OpenSSH Command Injection Vulnerability | 3 | 100 | Medium | YES |
| 375326 | Apache Cassandra RMI Rebind Vulnerability | 1 | 33 | Low | YES |
| 375593 | Docker Engine Denial of Service Vulnerability | 2 | 67 | Low | YES |

550

| Vulnerability ID | 678316 |
| --- | --- |
| Date Opened | 3/09/22 10:57AM |
| Vulnerability Title | Instance Rehydration |
| Affected ASV | ASVSECUREGUARDIANS |
| Component | Secure Guardian |
| Owner Contact | newevolution@email.com |
| Current Status | **Pending** |
| Previous Work & Decisions | • **Reached to ISO manager to get more guidance 3/09/22 9:57AM**<br>• Attempted to terminate and redeploy instance with latest AMI, vulnerability still existing 3/08/22 10:57AM<br>• Created a change order to remediate vulnerability 3/07/22 10:57AM |
| Planned Work & Decisions | • Requesting more assistance from the SG team<br>• Will be updating terraform and redeploying jenkins job |
| Estimated Time to Remediate (ETR) | **ETR is 3/10/22 10:30AM** |

BUILDING AND PROVIDING A REMEDIATION LIBRARY FOR CLOUD-BASED APPLICATIONS

BACKGROUND

Security vulnerabilities may arise when cloud-based applications are due for security patches or other software updates. Similarly, security vulnerabilities may arise, for example, when cloud-based images that support cloud-based applications are not refreshed (e.g., by having instances based on those images rebooted, rehydrated, or otherwise reestablished).

SUMMARY

Some implementations described herein relate to a system for automating remediation solutions for cloud-based applications using context-based machine learning. The system may include one or more memories and one or more processors communicatively coupled to the one or more memories. The one or more processors may be configured to receive an indication of a first instance of a security vulnerability associated with a cloud-based application. The one or more processors may be configured to receive an indication of one or more performed remediation steps associated with the security vulnerability. The one or more processors may be configured to receive an indication of one or more planned remediation steps associated with the security vulnerability. The one or more processors may be configured to apply a machine learning model, to the one or more performed remediation steps and the one or more planned remediation steps, to generate a recommended remediation procedure. The one or more processors may be configured to receive an indication of a second instance of the security vulnerability. The one or more processors may be configured to transmit an indication of the recommended remediation procedure in response to the indication of the second instance of the security vulnerability.

Some implementations described herein relate to a method of identifying remediation solutions using machine learning. The method may include receiving an indication of a current instance of a security vulnerability associated with a cloud-based application. The method may include determining, using a first machine learning model, a previous ticket associated with resolving a previous instance of the security vulnerability. The method may include generating, using a second machine learning model, an automated script associated with resolving the security vulnerability. The method may include transmitting instructions for a user interface (UI) indicating the current instance of the security vulnerability. The method may include receiving an indication of an interaction with the UI. The method may include transmitting instructions for an overlay, indicating the previous ticket and the automated script, in response to the indication of the interaction with the UI.

Some implementations described herein relate to a non-transitory computer-readable medium that stores a set of instructions for identifying security vulnerabilities for remediation using context-based machine learning. The set of instructions, when executed by one or more processors of a device, may cause the device to receive an indication of a set of performed remediation steps associated with a set of security vulnerabilities. The set of instructions, when executed by one or more processors of the device, may cause the device to receive an indication of a set of planned remediation steps associated with the set of security vulnerabilities. The set of instructions, when executed by one or more processors of the device, may cause the device to estimate a set of respective amounts of time associated with the set of security vulnerabilities. The set of instructions, when executed by one or more processors of the device, may cause the device to apply a machine learning model, to the set of performed remediation steps, the set of planned remediation steps, and the set of respective amounts of time, to select at least one security vulnerability from the set of security vulnerabilities. The set of instructions, when executed by one or more processors of the device, may cause the device to transmit an indication of the at least one security vulnerability.

BRIEF DESCRIPTION OF THE DRAWINGS

FIGS. 1A-1E are diagrams of an example implementation relating to building and providing a remediation library for cloud-based applications, in accordance with some embodiments of the present disclosure.

FIG. 4 is a diagram of an example data structure associated with automated remediation of security vulnerabilities, in accordance with some embodiments of the present disclosure.

FIGS. 5A-5B are diagrams of example UIs associated with security vulnerabilities, in accordance with some embodiments of the present disclosure.

DETAILED DESCRIPTION

Figure 1A:
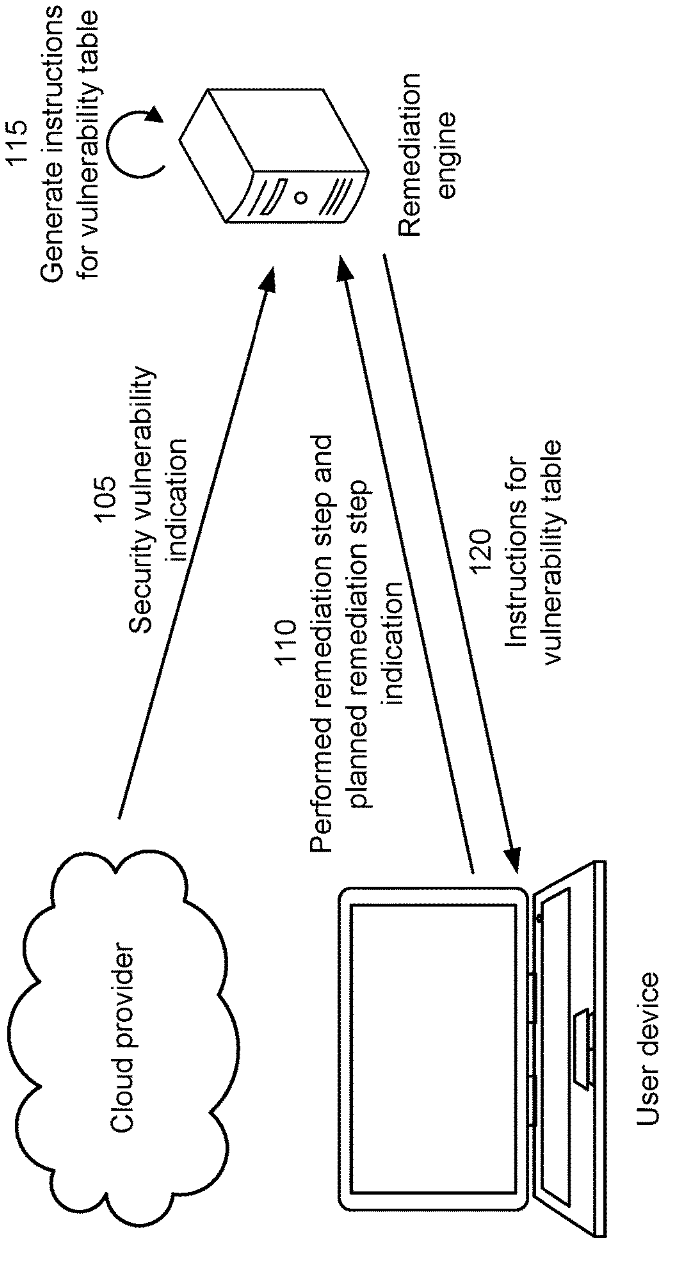
Figure 1A:

The following detailed description of example implementations refers to the accompanying drawings. The same reference numbers in different drawings may identify the same or similar elements.

In some cloud environments, application services (ASVs) or other cloud-based applications may exhibit security vulnerabilities. For example, vulnerabilities may arise when the cloud-based applications are due for security patches or other software updates. Similarly, cloud-based applications may experience vulnerabilities when corresponding cloud-based images (used, for example, to create cloud instances) are not periodically refreshed (e.g., by having instances based on those images rebooted, rehydrated, or otherwise reestablished). When cloud-based images are not refreshed, they may be referred to as “stale” and cloud-based applications relying on the images may be more susceptible to cyberattacks. Technical administrators may collect information regarding vulnerabilities associated with ASVs from corresponding cloud environments. However, the administrators may be required to communicate the vulnerabilities to users, who can then authorize security patches (or other software updates) and can refresh the cloud-based images.

Performing remediation of vulnerabilities automatically reduces delays between detection of the vulnerabilities and corresponding remediation procedures, thereby improving security within a corresponding cloud environment. Automated remediation may be provided using scripts (e.g., stored in Github® or another repository) or by copying steps performed from a previous instance of a same vulnerability (e.g., as documented in Slack®, Jira®, or another type of system). Some implementations described herein enable a single user interface (UI) to display automated remediation options, including automated scripts, previous tickets, chat conversations, and links to a code repository, among other examples. As a result, power, processing resources, and network resources are conserved that otherwise would have been wasted by a user attempting to track down automated remediation options for a vulnerability.

Some implementations described herein enable a machine learning model to identify vulnerabilities associated with complicated remediations. For example, the model may use historical information associated with the security vulnerabilities to identify vulnerabilities likely to cause downtime for large quantities of users and/or a large amount of time, among other examples. Identifying ideal vulnerabilities for automation conserves power and processing resources that would otherwise have been wasted on a bug bounty problem targeted toward vulnerabilities with small downtime.

FIGS. 1A-1E are diagrams of an example 100 associated with building and providing a remediation library for cloud-based applications. As shown in FIGS. 1A-1E, example 100 includes a user device, a cloud provider, a remediation engine, and a ticket management system. These devices are described in more detail in connection with FIGS. 6 and 7.

As shown in FIG. 1A and by reference number 105, the cloud provider may transmit, and the remediation engine may receive, an indication of a first instance of a security vulnerability associated with a cloud-based application. In some implementations, the remediation engine may transmit, and the cloud provider may receive, a request for information. For example, the request may include a hypertext transfer protocol (HTTP) request and/or an application programming interface (API) call, among other examples. The request may include (e.g., in a header and/or as an argument) an indication of the cloud-based application associated with the security vulnerability. Accordingly, the cloud provider may transmit the indication in response to the request. The remediation engine may transmit the request according to a schedule (e.g., once per hour or once per day, among other examples) and/or in response to a command to transmit the request. For example, the user device may transmit, and the remediation engine may receive, the command, such that the remediation engine transmits the request in response to the command.

Additionally, or alternatively, the remediation engine may subscribe to information updates from the cloud provider. Accordingly, the cloud provider may transmit the information according to a schedule (e.g., once per hour or once per day, among other examples) and/or as available (e.g., shortly after a change to the cloud-based application is detected).

Although the example 100 is described with the remediation engine receiving the indication of the security vulnerability from the cloud provider, other examples may additionally or alternatively include the remediation engine receiving the indication of the security vulnerability from a cloud database. For example, the cloud database may transmit, and the remediation engine may receive, information associated with the cloud-based application that indicates a security vulnerability. The cloud database may store information regarding security vulnerabilities. In some implementations, the cloud database may include an on-site database and/or a remote database storing the information. In some implementations, the cloud database may be relational, such that security vulnerability indications are stored in association (e.g., via rows and/or columns) with identifiers of cloud-based applications. As another example, the cloud database may be graphical, such that nodes representing cloud-based applications are connected (e.g., via edges) to nodes representing security vulnerability indications. In some implementations, the cloud database may receive the information automatically (e.g., as output from one or more ASVs) and/or manually (e.g., entered by one or more administrators associated with the cloud-based applications). In some implementations, the security vulnerability indications may indicate a required patch and/or other software update, a missing firewall or other network security software, missing anti-virus and/or other anti-malware software, subpar encryption keys and/or other encryption protocols, out-of-date hardware drivers, and/or other vulnerabilities associated with cloud-based applications.

As shown by reference number 110, the user device may transmit, and the remediation engine may receive, an indication of performed remediation steps (e.g., one or more performed remediation steps) and/or planned remediation steps (e.g., one or more planned remediation steps) associated with the security vulnerability. The indication may include strings (e.g., one or more strings) describing the performed remediation steps and/or the planned remediation steps. Additionally, or alternatively, the indication may indicate commands (e.g., Bourne Again Shell (BASH) instructions, Python instructions, and/or other instructions encoding the commands) executed by the user device to trigger the cloud provider to execute the performed remediation steps and/or planned by the user to trigger the cloud provider to execute the planned remediation steps. In some implementations, the indication may additionally include datetimes associated with the performed remediation steps and/or the planned remediation steps.

In some implementations, the remediation engine may transmit, and the user device may receive, a request for information. For example, the remediation engine may transmit the request for information in response to the indication of the first instance of the security vulnerability. The user device may transmit the indication of the performed remediation steps and/or the planned remediation steps in response to the request for information.

In some implementations, a user of the user device (e.g., an administrator associated with the cloud-based application) may interact with a UI (e.g., via a keyboard, a mouse, a touchscreen, or another type of input component) and trigger the user device to transmit the indication of the performed remediation steps and/or the planned remediation steps. For example, the remediation engine may transmit instructions for the UI to the user device, and the user device may transmit the indication of the performed remediation steps and/or the planned remediation steps after showing the UI to the user and in response to the user interacting with the UI. Additionally, or alternatively, the user device may access (e.g., using a web browser or another type of application) a website hosted by (or otherwise associated with) the remediation engine. Accordingly, the user device may transmit the indication of the performed remediation steps and/or the planned remediation steps after showing the website to the user and in response to the user interacting with the website.

As shown by reference number 115, the remediation engine may generate instructions for a UI indicating the first instance of the security vulnerability. The UI may include a tabular representation of the first instance of the security vulnerability, as described in connection with FIG. 5A. Accordingly, the UI may indicate the first instance of the security vulnerability using a row in the tabular representation. Other representations may include a graph representation, for example. As shown by reference number 120, the remediation engine may transmit, and the user device may receive, the instructions for the UI. Accordingly, the user device may show or otherwise output the UI based on the instructions (e.g., via a display, a speaker, or another type of output component). Although the example 100 is described in connection with a visual representation, other examples may include the remediation engine outputting an indication of the first instance of the security vulnerability to the user device as text or a non-visual data type.

In some implementations, the remediation engine may transmit the instructions for the UI in response to the indication of the performed remediation steps and/or the planned remediation steps. Additionally, or alternatively, the user of the user device (e.g., the administrator associated with the cloud-based application) may trigger the user device to transmit a request for the UI. For example, the user device may transmit a set of credentials associated with the user, and the remediation engine may transmit the instructions for the UI in response to the set of credentials and after verifying the set of credentials. Additionally, or alternatively, the user device may access (e.g., using a web browser or another type of application) a website hosted by (or otherwise associated with) the remediation engine. Accordingly, the user device may transmit a request for the UI after showing the website to the user and in response to the user interacting with the website.

Figure 1B:
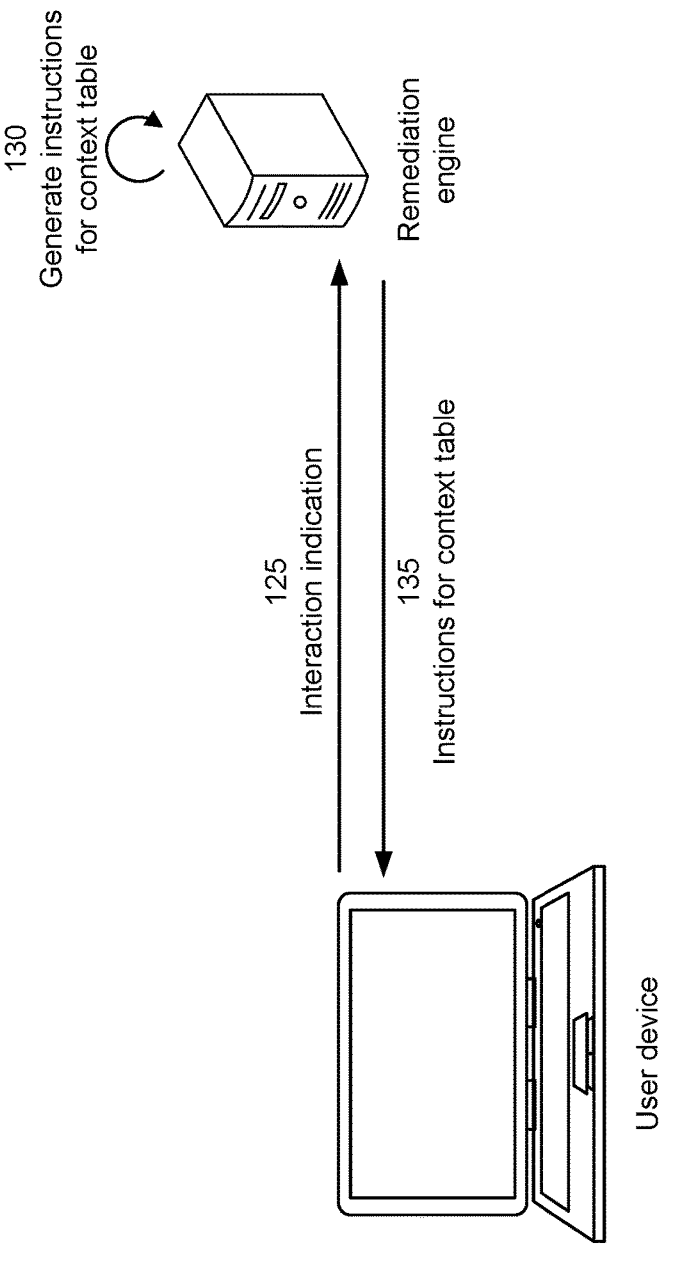
Figure 1B:

As shown in FIG. 1B and by reference number 125, the user device may transmit, and the remediation engine may receive, an indication of an interaction with the UI. For example, the user of the user device may interact with the UI (e.g., via a keyboard, a mouse, a touchscreen, or another type of input component) and trigger the user device to transmit the indication. The user may perform a left click, a tap, push an enter key, speak an audio command, or perform another type of action to interact with the UI. In some implementations, as described in connection with FIG. 5A, the user may interact with a context indicator associated with the first instance of the security vulnerability.

As shown by reference number 130, the remediation engine may generate instructions for a visual representation of the performed remediation steps and/or the planned remediation steps. The visual representation may include a context table, as described in connection with FIG. 5B. Accordingly, the visual representation may indicate the performed remediation steps and/or the planned remediation steps using a row in the context table. Other representations may include a graph representation, for example. As shown by reference number 135, the remediation engine may transmit, and the user device may receive, the instructions for the visual representation. Accordingly, the user device may show or otherwise output the context table based on the instructions (e.g., via a display, a speaker, or another type of output component). Although the example 100 is described in connection with a visual representation, other examples may include the remediation engine outputting an indication of the performed remediation steps and/or the planned remediation steps to the user device as text or a non-visual data type. The remediation engine may transmit the instructions for the UI in response to the indication of the interaction.

Figure 1C:
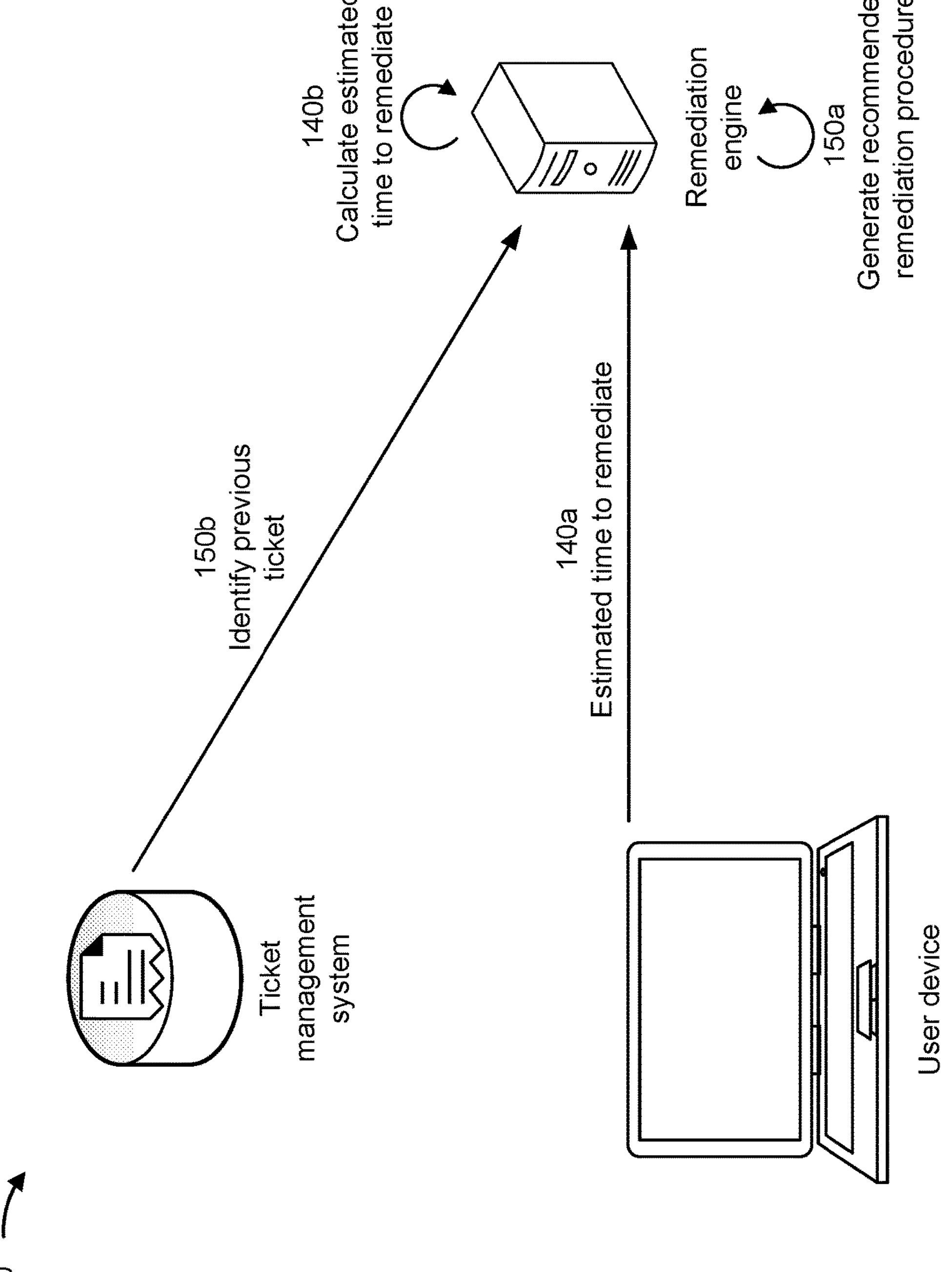

Additionally, or alternatively, the remediation engine may use the context table to recommend a remediation procedure and/or automate a remediation procedure. For example, the user device may transmit, and the remediation engine may receive, an amount of time associated with the security vulnerability. As shown in FIG. 1C and by reference number 140*a*, the amount of time may be an estimated amount of time to remediate the security vulnerability. In some implementations, the remediation engine may transmit, and the user device may receive, a request for information. The user device may transmit the amount of time in response to the request for information. Although the example 100 shows the amount of time transmitted separately from the indication of the performed remediation steps and/or the planned remediation steps, other examples may include the amount of time in a same message as the indication of the performed remediation steps and/or the planned remediation steps.

In some implementations, the user of the user device (e.g., the administrator associated with the cloud-based application) may interact with a UI (e.g., via a keyboard, a mouse, a touchscreen, or another type of input component) and trigger the user device to transmit the amount of time. For example, the remediation engine may transmit instructions for the UI to the user device, and the user device may transmit the amount of time after showing the UI to the user and in response to the user interacting with the UI. Additionally, or alternatively, the user device may access (e.g., using a web browser or another type of application) a website hosted by (or otherwise associated with) the remediation engine. Accordingly, the user device may transmit the amount of time after showing the website to the user and in response to the user interacting with the website.

Additionally, or alternatively, the remediation engine may calculate an amount of time associated with the security vulnerability. As shown by reference number 140*b*, the amount of time may be an estimated amount of time to remediate the security vulnerability. For example, the remediation engine may estimate the amount of time by comparing timestamps associated with the performed remediation steps to estimate the amount of time. Additionally, or alternatively, the remediation engine may estimate the amount of time by summing estimated amounts of time associated with the planned remediation steps to estimate the amount of time. The remediation engine may determine the estimated amounts of time from a database storing indications of remediation steps in association with corresponding estimated amounts of time (to execute the remediation steps). The database may be implemented in a local storage (e.g., a memory managed by the remediation engine) or in a storage that is at least partially separate (e.g., physically, logically, and/or virtually) from the remediation engine. Therefore, the remediation engine may transmit a query, that indicates the planned remediation steps, to the database (e.g., included in an HTTP request and/or using an API call) and receive a response to the query (e.g., included in an HTTP response and/or as a return from the API call) that includes the estimated amounts of time.

Accordingly, the remediation engine may apply a machine learning model, to the performed remediation steps, the planned remediation steps, and/or the amount of time, in order to generate a recommended remediation procedure, as shown by reference number 150*a*. In some implementations, the model may include a regression algorithm (e.g., linear regression or logistic regression), which may include a regularized regression algorithm (e.g., Lasso regression, Ridge regression, or Elastic-Net regression). Additionally, or alternatively, the model may include a decision tree algorithm, which may include a tree ensemble algorithm (e.g., generated using bagging and/or boosting), a random forest algorithm, or a boosted trees algorithm. A model parameter may include an attribute of a machine learning model that is learned from data input into the model (e.g., the historical cloud computing task information). For example, for a regression algorithm, a model parameter may include a regression coefficient (e.g., a weight). For a decision tree algorithm, a model parameter may include a decision tree split location, as an example.

Additionally, the remediation engine may use one or more hyperparameter sets to tune the model. A hyperparameter may include a structural parameter that controls execution of a machine learning algorithm by the cloud management device, such as a constraint applied to the machine learning algorithm. Unlike a model parameter, a hyperparameter is not learned from data input into the model. An example hyperparameter for a regularized regression algorithm includes a strength (e.g., a weight) of a penalty applied to a regression coefficient to mitigate overfitting of the model. The penalty may be applied based on a size of a coefficient value (e.g., for Lasso regression, such as to penalize large coefficient values), may be applied based on a squared size of a coefficient value (e.g., for Ridge regression, such as to penalize large squared coefficient values), may be applied based on a ratio of the size and the squared size (e.g., for Elastic-Net regression), and/or may be applied by setting one or more feature values to zero (e.g., for automatic feature selection). Example hyperparameters for a decision tree algorithm include a tree ensemble technique to be applied (e.g., bagging, boosting, a random forest algorithm, and/or a boosted trees algorithm), a number of features to evaluate, a number of observations to use, a maximum depth of each decision tree (e.g., a number of branches permitted for the decision tree), or a number of decision trees to include in a random forest algorithm.

Other examples may use different types of models, such as a Bayesian estimation algorithm, a k-nearest neighbor algorithm, an a priori algorithm, a k-means algorithm, a support vector machine algorithm, a neural network algorithm (e.g., a convolutional neural network algorithm), and/or a deep learning algorithm. In some implementations, the model may be a clustering model that groups similar security vulnerabilities together. Accordingly, the remediation engine may generate the recommended remediation procedure based on performed remediation steps and/or planned remediation steps for other security vulnerabilities in a same cluster as the security vulnerability.

In some implementations, the remediation engine may apply the machine learning model in order to generate an automated script representing the recommended remediation procedure. For example, the compliance server may generate the script in response to the recommended remediation procedure. The automated script may instruct the cloud provider to perform an action for a cloud-based application associated with the selected compliance activity. For example, the automated script may trigger a patch and/or other software update to a cloud-based application or trigger a refresh (also referred to as a "reboot" or a "rehydration") for a cloud-based storage supporting the cloud-based application, among other examples. The automated script may include a sequence of instructions corresponding to a plurality of commands for performing the action. For example, the remediation engine may generate BASH instructions, Python instructions, and/or other scriptable instructions that will trigger the plurality of commands to be executed by the cloud provider.

Additionally, or alternatively, as shown by reference number 150*b*, the remediation engine may identify a previous ticket associated with resolving a previous instance of the security vulnerability. In some implementations, the ticket management system may transmit, and the remediation engine may receive, a set of tickets associated with the security vulnerability. For example, the remediation engine may transmit, and the ticket management system may receive, a request for the set of tickets. For example, the request may include an HTTP request and/or an API call, among other examples. The request may include (e.g., in a header and/or as an argument) an indication of the security vulnerability. Accordingly, the ticket management system may transmit the set of tickets in response to the request. The remediation engine may determine the previous ticket, from the set of tickets, by applying the machine learning model. For example, the machine learning model may output an indication that the previous ticket is most likely to have resolved the security vulnerability.

Alternatively, the user device may transmit, and the remediation engine may receive, an indication of the previous ticket. For example, the remediation engine may transmit, and the user device may receive, a request. For example, the request may include an HTTP request and/or an API call, among other examples. The request may include (e.g., in a header and/or as an argument) an indication of the security vulnerability. Accordingly, the user device may transmit the indication of the previous ticket in response to the request. The remediation engine may apply the machine learning model to validate that the previous ticket resolved the previous instance of the security vulnerability. For example, the machine learning model may output a probability that the previous ticket resolved the security vulnerability. In some implementations, the remediation engine may transmit, and the ticket management system may receive, a request for the previous ticket based on the indication from the user device. The request may include (e.g., in a header and/or as an argument) the indication of the previous ticket. Accordingly, the ticket management system may transmit the previous ticket in response to the request.

Figure 1D:
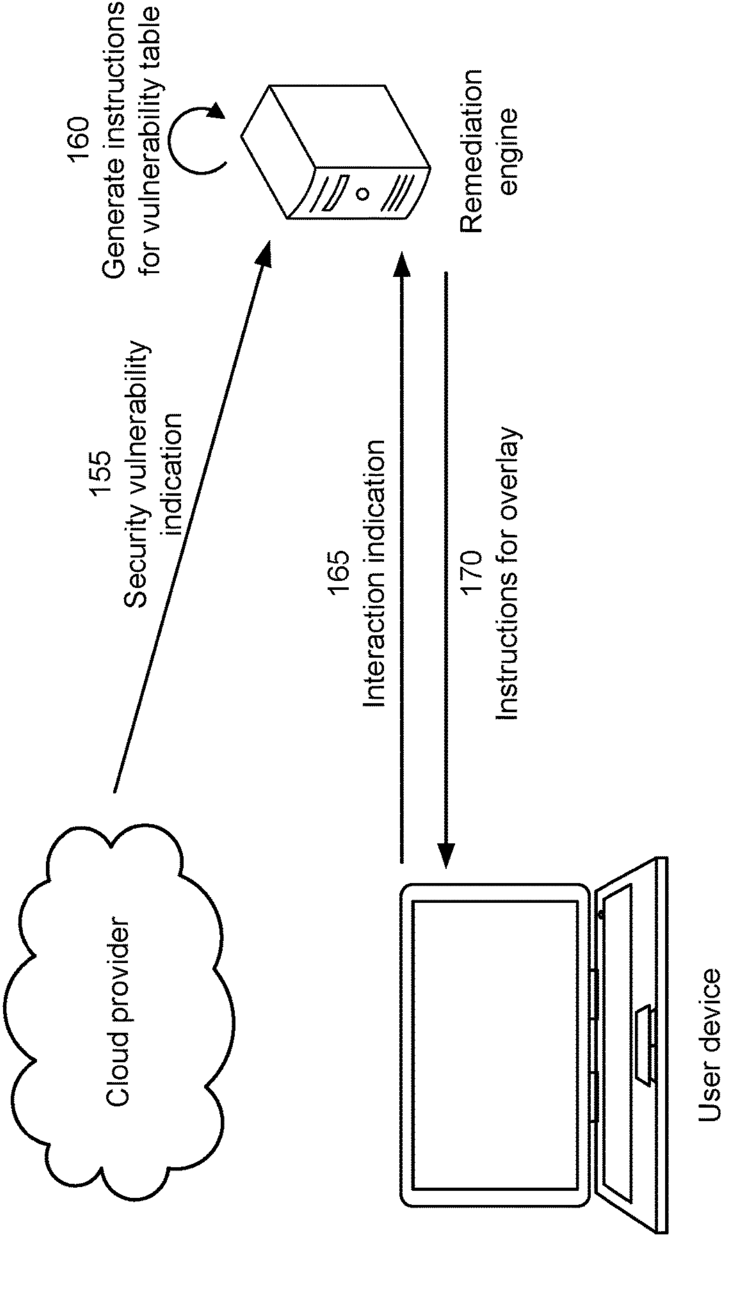
Figure 1D:

Therefore, when the security vulnerability repeats, as shown in FIG. 1D, the remediation engine may provide options for remediation. As shown by reference number 155, the cloud provider may transmit, and the remediation engine may receive, an indication of a second instance of the security vulnerability (associated with the cloud-based application). Although the example 100 is described with the remediation engine receiving the indication from the cloud provider, other examples may additionally or alternatively include the remediation engine receiving the indication from a cloud database, as described in connection with reference number 105.

As shown by reference number 160, the remediation engine may generate instructions for a UI indicating the second instance of the security vulnerability. The UI may include a tabular representation of the second instance of the security vulnerability, as described in connection with FIG. 3A. Accordingly, the UI may indicate the second instance of the security vulnerability using a row in the tabular representation. Other representations may include a graph representation, for example. Additionally, the remediation engine may transmit, and the user device may receive, the instructions for the UI. Accordingly, the user device may show or otherwise output the UI based on the instructions (e.g., via a display, a speaker, or another type of output component). Although the example 100 is described in connection with a visual representation, other examples may include the remediation engine outputting an indication of the second instance of the security vulnerability to the user device as text or a non-visual data type.

In some implementations, the user of the user device (e.g., the administrator associated with the cloud-based application) may trigger the user device to transmit a request for the UI. For example, the user device may transmit a set of credentials associated with the user, and the remediation engine may transmit the instructions for the UI in response to the set of credentials and after verifying the set of credentials. Additionally, or alternatively, the user device may access (e.g., using a web browser or another type of application) a website hosted by (or otherwise associated with) the remediation engine. Accordingly, the user device may transmit a request for the UI after showing the website to the user and in response to the user interacting with the website.

As shown by reference number 165, the user device may transmit, and the remediation engine may receive, an indication of an interaction with the UI. For example, the user of the user device may interact with the UI (e.g., via a keyboard, a mouse, a touchscreen, or another type of input component) and trigger the user device to transmit the indication. The user may perform a left click, a tap, push an enter key, speak an audio command, or perform another type of action to interact with the UI. In some implementations, as described in connection with FIG. 3A, the user may interact with a remediation indicator associated with the second instance of the security vulnerability.

In response to the indication of the interaction, the remediation engine may generate instructions for an overlay. The overlay may be as described in connection with FIG. 3B. Accordingly, the overlay may indicate a previous ticket associated with remediation of the security vulnerability (e.g., determined as described above) and/or an automated script for remediating the security vulnerability (e.g., generated as described above). Other representations may include a graph representation, for example. As shown by reference number 170, the remediation engine may transmit, and the user device may receive, the instructions for the overlay. Accordingly, the user device may show or otherwise output the overlay based on the instructions (e.g., via a display, a speaker, or another type of output component). Although the example 100 is described in connection with a visual overlay, other examples may include the remediation engine outputting an indication of the previous ticket and/or the automated script as text or a non-visual data type.

In some implementations, the remediation may additionally determine a chat conversation associated with resolving the security vulnerability and/or a code repository associated with resolving the security vulnerability. For example, the user device may transmit, and the remediation engine may receive, an indication of the chat conversation and/or an indication of the code repository. The remediation engine may apply the machine learning model to validate that the chat conversation and/or the code repository resolved a previous instance of the security vulnerability. For example, the machine learning model may output a probability that the chat conversation and/or the code repository resolved the security vulnerability. Therefore, as described in connection with FIG. 3B, the overlay may further indicate the chat conversation and/or the code repository.

The overlay may additionally be interactive. Thus, as shown in FIG. 1E and by reference number 175, the user device may transmit, and the remediation engine may receive, an indication of an interaction with the overlay. For example, the user of the user device may interact with the overlay (e.g., via a keyboard, a mouse, a touchscreen, or another type of input component) and trigger the user device to transmit the indication. The user may perform a left click, a tap, push an enter key, speak an audio command, or perform another type of action to interact with the overlay. In some implementations, as described in connection with FIG. 3B, the user may interact with a button included in the overlay.

In one example, as shown by reference number 180*a*, the remediation engine may trigger execution of the automated script in response to the indication of the interaction with the overlay. Therefore, the recommendation engine will trigger commands to the cloud provider to remediate the security vulnerability. In another example, as shown by reference number 180*b*, the remediation engine may transmit, and the user device may receive, a link (e.g., a uniform resource locator (URL) or another type of link) to the previous ticket (that resolved the security vulnerability) in response to the indication of the interaction with the overlay. Therefore, the user of the user device (e.g., the administrator associated with the cloud-based application) may interact with the link (e.g., via a keyboard, a mouse, a touchscreen, or another type of input component) and trigger the user device to retrieve the previous ticket from the ticket management system. For example, the user device may transmit a request for the previous ticket, and the ticket management system may transmit the previous ticket, as shown by reference number 185, in response to the request. The remediation engine may similarly transmit a link to the code repository or a link to the chat conversation based on the indication of the interaction.

By using techniques as described in connection with FIGS. 1A-1E, the remediation engine allows for automatic remediation of the security vulnerability to reduce a delay between detection of the security vulnerability and performance of the recommended remediation procedure, thereby improving security within the cloud provider. Because a single UI displays automated remediation options, including automated scripts, previous tickets, chat conversations, and/or links to a code repository, power, processing resources, and network resources are conserved that otherwise would have been wasted by the user attempting to track down automated remediation options for a vulnerability.

As indicated above, FIGS. 1A-1E are provided as an example. Other examples may differ from what is described with regard to FIGS. 1A-1E.

Figure 2A:
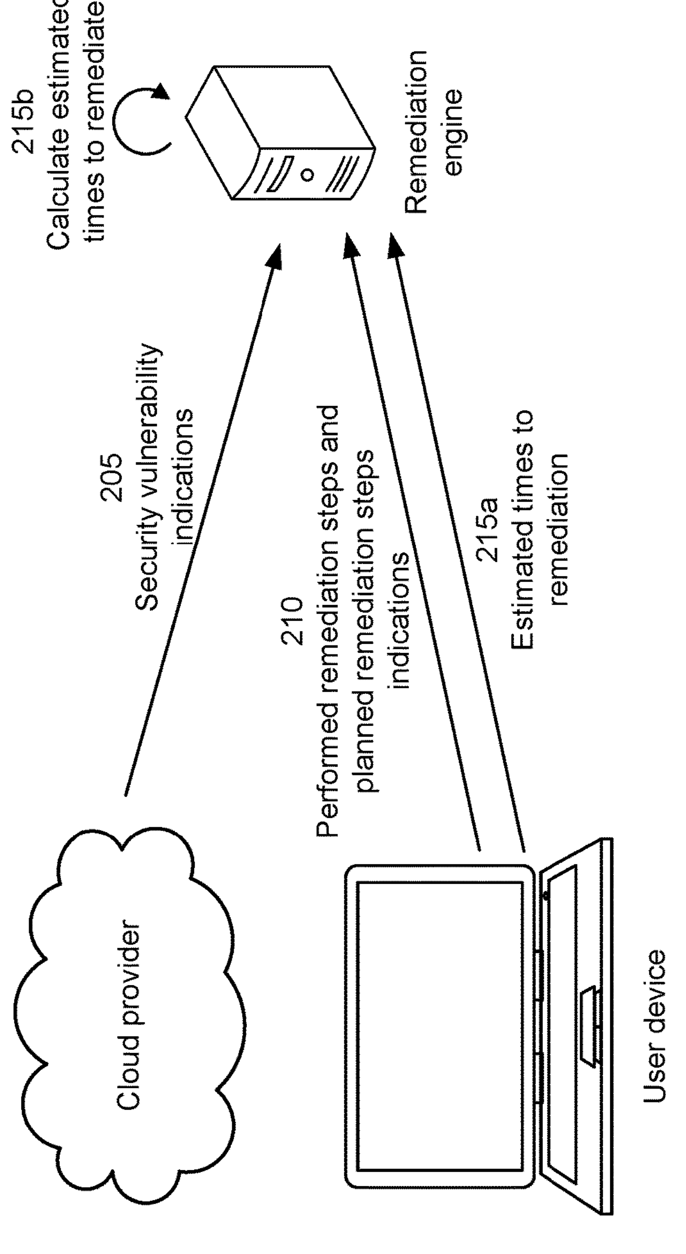
FIGS. 2A-2B are diagrams of an example implementation relating to attempting remediation automation for cloud-based applications, in accordance with some embodiments of the present disclosure.
Figure 2B:
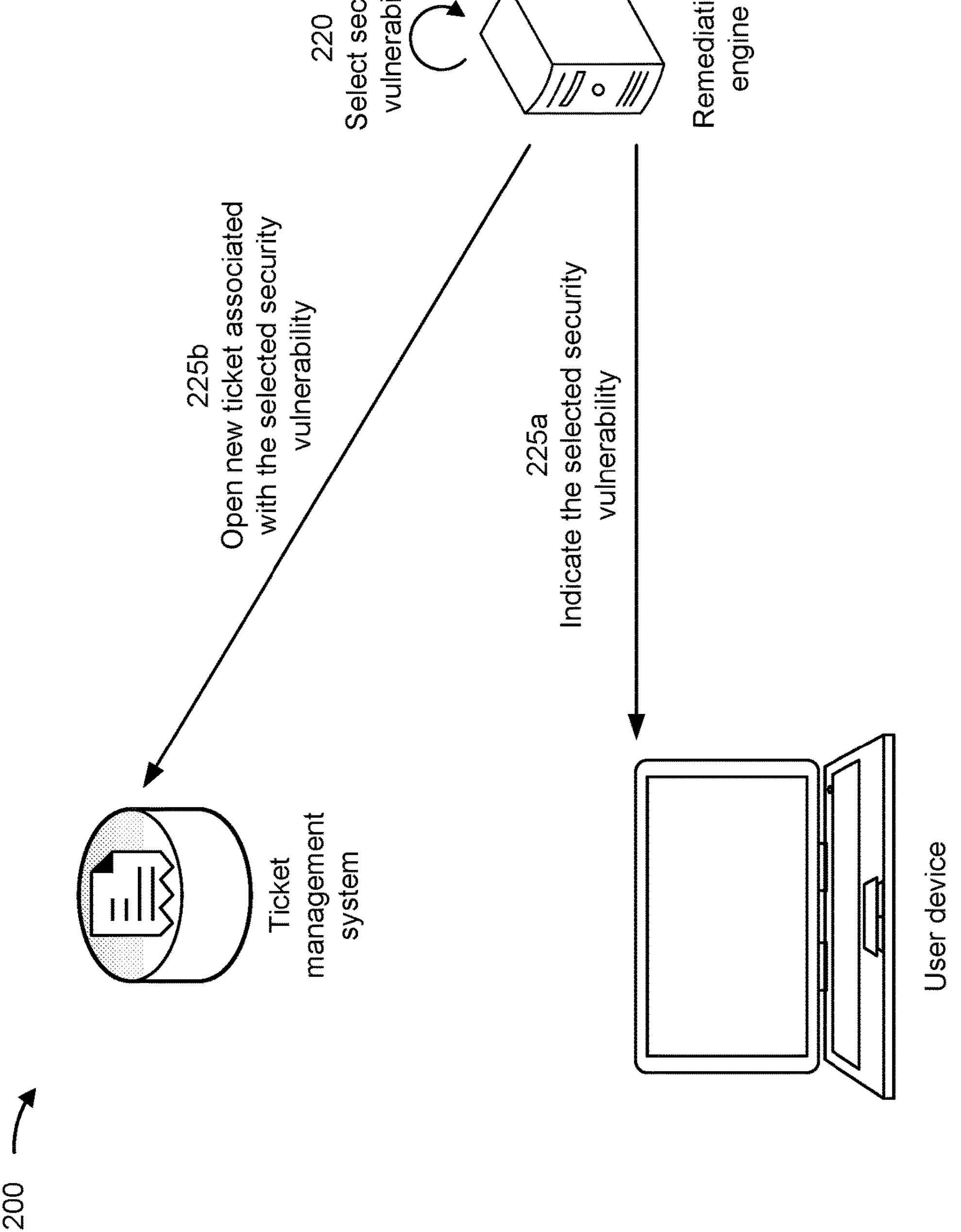

FIGS. 2A-2B are diagrams of an example 200 associated with attempting remediation automation for cloud-based applications. As shown in FIGS. 2A-2B, example 200 includes a user device, a cloud provider, a remediation engine, and a ticket management system. These devices are described in more detail in connection with FIGS. 6 and 7.

As shown in FIG. 2A and by reference number 205, the cloud provider may transmit, and the remediation engine may receive, an indication of a set of security vulnerabilities (e.g., associated with a set of cloud-based applications). In some implementations, the remediation engine may transmit, and the cloud provider may receive, a request for information. For example, the request may include an HTTP request and/or an API call, among other examples. The request may include (e.g., in a header and/or as an argument) an indication of the set of cloud-based applications associated with the set of security vulnerabilities. Accordingly, the cloud provider may transmit the indication in response to the request. The remediation engine may transmit the request according to a schedule (e.g., once per hour or once per day, among other examples) and/or in response to a command to transmit the request. For example, the user device may transmit, and the remediation engine may receive, the command, such that the remediation engine transmits the request in response to the command.

Additionally, or alternatively, the remediation engine may subscribe to information updates from the cloud provider. Accordingly, the cloud provider may transmit the information according to a schedule (e.g., once per hour or once per day, among other examples) and/or as available (e.g., shortly after a set of changes to the set of cloud-based applications is detected).

Although the example 100 is described with the remediation engine receiving the indication of the set of security vulnerabilities from the cloud provider, other examples may additionally or alternatively include the remediation engine receiving the indication of the set of security vulnerabilities from a cloud database. For example, the cloud database may transmit, and the remediation engine may receive, information associated with the set of cloud-based applications that indicates a set of security vulnerabilities. The cloud database may store information regarding security vulnerabilities. In some implementations, the cloud database may include an on-site database and/or a remote database storing the information. In some implementations, the cloud database may be relational, such that security vulnerability indications are stored in association (e.g., via rows and/or columns) with identifiers of cloud-based applications. As another example, the cloud database may be graphical, such that nodes representing cloud-based applications are connected (e.g., via edges) to nodes representing security vulnerability indications. In some implementations, the cloud database may receive the information automatically (e.g., as output from one or more ASVs) and/or manually (e.g., entered by one or more administrators associated with the cloud-based applications). In some implementations, the security vulnerability indications may indicate a required patch and/or other software update, a missing firewall or other network security software, missing anti-virus and/or other anti-malware software, subpar encryption keys and/or other encryption protocols, out-of-date hardware drivers, and/or other vulnerabilities associated with cloud-based applications.

As shown by reference number 210, the user device may transmit, and the remediation engine may receive, an indication of a set of performed remediation steps and/or a set of planned remediation steps associated with the set of security vulnerabilities (and thus associated with the set of cloud-based applications). The indication may include strings (e.g., one or more strings) describing the set of performed remediation steps and/or the set of planned remediation steps. Additionally, or alternatively, the indication may indicate commands (e.g., BASH instructions, Python instructions, and/or other instructions encoding the commands) executed by the user device to trigger the cloud provider to execute the set of performed remediation steps and/or planned by the user to trigger the cloud provider to execute the set of planned remediation steps. In some implementations, the indication may additionally include datetimes associated with the set of performed remediation steps and/or the set of planned remediation steps.

In some implementations, the remediation engine may transmit, and the user device may receive, a request for information. For example, the remediation engine may transmit the request for information in response to the indication of the set of security vulnerabilities. The user device may transmit the indication of the set of performed remediation steps and/or the set of planned remediation steps in response to the request for information.

In some implementations, a user of the user device (e.g., an administrator associated with the set of cloud-based applications) may interact with a UI (e.g., via a keyboard, a mouse, a touchscreen, or another type of input component) and trigger the user device to transmit the indication of the set of performed remediation steps and/or the set of planned remediation steps. For example, the remediation engine may transmit instructions for the UI to the user device, and the user device may transmit the indication of the set of performed remediation steps and/or the set of planned remediation steps after showing the UI to the user and in response to the user interacting with the UI. Additionally, or alternatively, the user device may access (e.g., using a web browser or another type of application) a website hosted by (or otherwise associated with) the remediation engine. Accordingly, the user device may transmit the indication of the set of performed remediation steps and/or the set of planned remediation steps after showing the website to the user and in response to the user interacting with the website.

Additionally, in some implementations, the user device may transmit, and the remediation engine may receive, a set of respective amounts of time associated with the set of security vulnerabilities. As shown by reference number 215*a*, each respective amount of time, out of the set of respective amounts of time, may be an estimated amount of time to remediate a corresponding security vulnerability out of the set of security vulnerabilities. In some implementations, the remediation engine may transmit, and the user device may receive, a request for information. The user device may transmit the set of respective amounts of time in response to the request for information. Although the example 100 shows the set of respective amounts of time transmitted separately from the indication of the set of performed remediation steps and/or the set of planned remediation steps, other examples may include the set of respective amounts of time in a same message as the indication of the set of performed remediation steps and/or the set of planned remediation steps.

In some implementations, the user of the user device (e.g., the administrator associated with the cloud-based application) may interact with a UI (e.g., via a keyboard, a mouse, a touchscreen, or another type of input component) and trigger the user device to transmit the set of respective amounts of time. For example, the remediation engine may transmit instructions for the UI to the user device, and the user device may transmit the set of respective amounts of time after showing the UI to the user and in response to the user interacting with the UI. Additionally, or alternatively, the user device may access (e.g., using a web browser or another type of application) a website hosted by (or otherwise associated with) the remediation engine. Accordingly, the user device may transmit the set of respective amounts of time after showing the website to the user and in response to the user interacting with the website.

Additionally, or alternatively, the remediation engine may calculate a set of respective amounts of time associated with the set of security vulnerabilities. As shown by reference number 215*b*, each respective amount of time, out of the set of respective amounts of time, may be an estimated amount of time to remediate a corresponding security vulnerability out of the set of security vulnerabilities. For example, the remediation engine may estimate the set of respective amounts of time by comparing timestamps associated with the set of performed remediation steps. Additionally, or alternatively, the remediation engine may estimate the set of respective amounts of time by summing estimated amounts of time associated with the set of planned remediation steps. The remediation engine may determine the estimated amounts of time from a database storing indications of remediation steps in association with corresponding estimated amounts of time (to execute the remediation steps). The database may be implemented in a local storage (e.g., a memory managed by the remediation engine) or in a storage that is at least partially separate (e.g., physically, logically, and/or virtually) from the remediation engine. Therefore, the remediation engine may transmit a query, that indicates the planned remediation steps, to the database (e.g., included in an HTTP request and/or using an API call) and receive a response to the query (e.g., included in an HTTP response and/or as a return from the API call) that includes the estimated amounts of time.

Although the example 100 shows a single user device providing the set of respective amounts of time, the set of performed remediation steps, and/or the set of planned remediation steps, other examples may include the remediation engine crowdsourcing the set of respective amounts of time, the set of performed remediation steps, and/or the set of planned remediation steps from multiple user devices. For example, one user device may transmit an indication of an amount of time, performed remediation steps, and/or planned remediation steps associated with a first security vulnerability, and another user device may transmit an indication of an amount of time, performed remediation steps, and/or planned remediation steps associated with a second security vulnerability. Additionally, or alternatively, in another example, one user device may transmit an indication of a first amount of time, first performed remediation steps, and/or first planned remediation steps associated with a security vulnerability, and another user device may transmit an indication of a second amount of time, second performed remediation steps, and/or second planned remediation steps associated with the same security vulnerability.

As shown in FIG. 2B and by reference number 220, the remediation engine may apply a machine learning model, to the set of performed remediation steps, the set of planned remediation steps, and the set of respective amounts of time, to select a security vulnerability (e.g., at least one security vulnerability) from the set of security vulnerabilities. In some implementations, the model may include a regression algorithm (e.g., linear regression or logistic regression), which may include a regularized regression algorithm (e.g., Lasso regression, Ridge regression, or Elastic-Net regression). Additionally, or alternatively, the model may include a decision tree algorithm, which may include a tree ensemble algorithm (e.g., generated using bagging and/or boosting), a random forest algorithm, or a boosted trees algorithm. Additionally, the compliance server may use one or more hyperparameter sets to tune the machine learning model.

Other examples may use different types of models, such as a Bayesian estimation algorithm, a k-nearest neighbor algorithm, an a priori algorithm, a k-means algorithm, a support vector machine algorithm, a neural network algorithm (e.g., a convolutional neural network algorithm), and/or a deep learning algorithm. In some implementations, the model may be a clustering model that groups similar security vulnerabilities together. Accordingly, the remediation engine may select the security vulnerability from a cluster associated with the most severe security vulnerabilities. For example, the remediation engine may use the machine learning model to select the security vulnerability based on determining that a quantity of affected users associated with the selected security vulnerability satisfies a user quantity threshold. Additionally, or alternatively, the remediation engine may use the machine learning model to select the security vulnerability based on determining that an amount of remediation time associated with the selected security vulnerability satisfies a time threshold. Additionally, or alternatively, the remediation engine may use the machine learning model to select the security vulnerability based on determining that a quantity of remediation steps (whether performed or planned) associated with the selected security vulnerability satisfies a steps threshold.

As shown by reference number 225*a*, the remediation engine may transmit, and the user device may receive, an indication of the selected security vulnerability. Accordingly, the user device may show or otherwise output the indication for the user of the user device (e.g., via a display, a speaker, or another type of output component). The indication may be included in a visual representation, in text, or in a non-visual data type.

In some implementations, the indication may include a bounty associated with the selected security vulnerability. For example, the remediation engine may transmit the indication as part of an alert for a bug bounty program. The type of the bounty may include cash, a gift card, or a certificate (or other commendation), among other examples. The amount of the bounty may include a monetary value or another measure of value associated with the bounty.

The remediation engine may select a type and/or an amount of the bounty using a database. For example, the database may associate properties associated with security vulnerabilities (e.g., quantities of affected users, amounts of remediation time, and/or quantities of remediation steps, among other examples) with types and/or amounts of bounties. The database may be implemented in a local storage (e.g., a memory managed by the remediation engine) or in a storage that is at least partially separate (e.g., physically, logically, and/or virtually) from the remediation engine. Therefore, the remediation engine may transmit a query, that includes properties associated with the selected security vulnerability, to the database (e.g., included in an HTTP request and/or using an API call) and receive a response to the query (e.g., included in an HTTP response and/or as a return from the API call) that indicates the type and/or the amount of the bounty. The remediation engine may alternatively use a formula that accepts properties associated with security vulnerabilities as input and outputs types and/or amounts of bounties.

Additionally, or alternatively, the remediation engine may apply the machine learning model, described above, to determine a type and/or an amount of the bounty. For example, the remediation engine may use the machine learning model to select the type and/or the amount of the bounty based on properties associated with the selected security vulnerability (e.g., a quantity of affected users, an amount of remediation time, and/or a quantity of remediation steps, among other examples).

Additionally, or alternatively, as shown by reference number 225*b*, the remediation engine may transmit, and the ticket management system may receive, a command to open a new ticket associated with the selected security vulnerability. For example, the ticket may be used as part of a bug bounty program. The command may therefore indicate the type and/or the amount of the bounty such that the ticket indicates the same.

By using techniques as described in connection with FIGS. 2A-2B, the remediation engine identifies severe vulnerabilities and/or vulnerabilities associated with complicated remediations. As a result, the remediation engine may identify ideal vulnerabilities for a bug bounty program (and thus for automation), which conserves power and processing resources that would otherwise have been wasted on the bug bounty problem targeted toward non-severe and/or uncomplicated vulnerabilities.

As indicated above, FIGS. 2A-2B are provided as an example. Other examples may differ from what is described with regard to FIGS. 2A-2B.

Figure 3A:
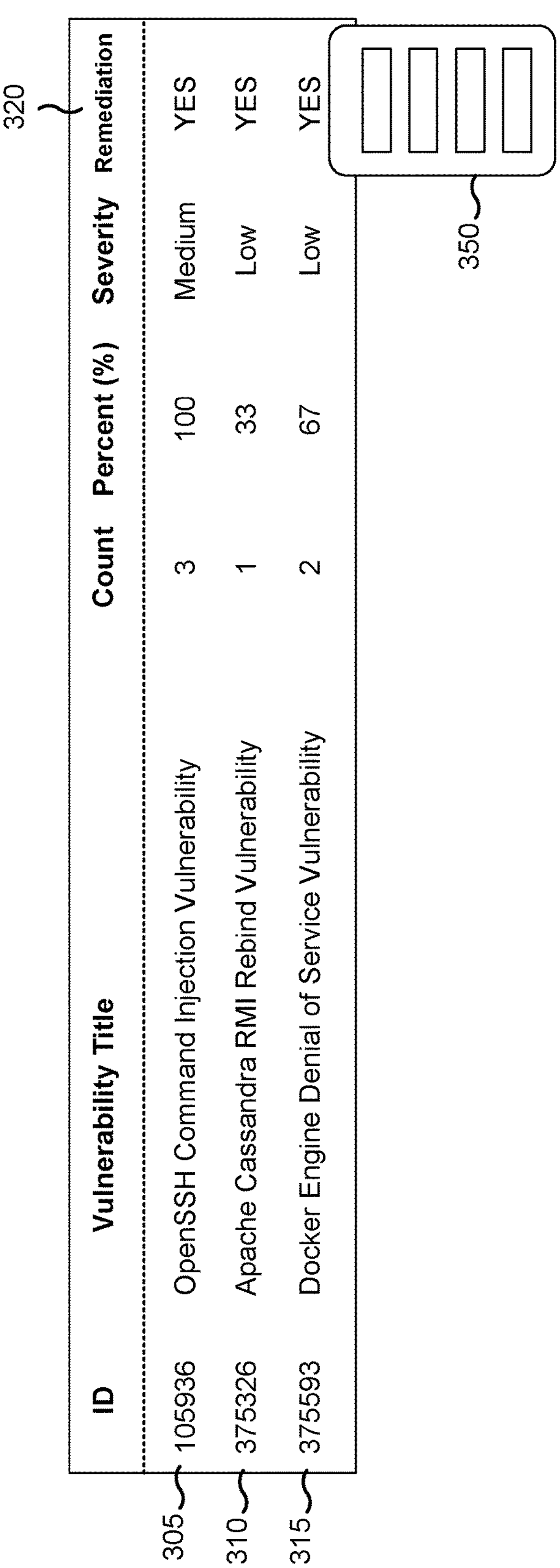
FIGS. 3A-3B are diagrams of example user interfaces (UIs) associated with automated remediation of security vulnerabilities, in accordance with some embodiments of the present disclosure.
Figure 3B:
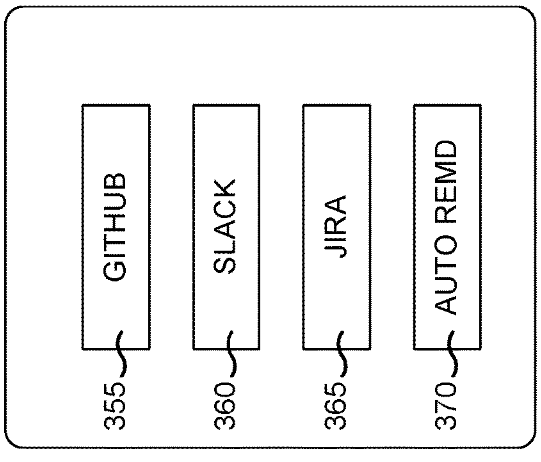

FIGS. 3A and 3B are diagrams of an example UI 300 and an example overlay 350, respectively, associated with automated remediation of security vulnerabilities. The example UI 300 and the example overlay 350 may be shown by a user device (e.g., based on instructions from a remediation engine). These devices are described in more detail in connection with FIGS. 6 and 7.

As shown in FIG. 3A, the example UI 300 includes a tabular representation of security vulnerabilities. Accordingly, each row (e.g., row 305, row 310, and row 315 in FIG. 3A) is associated with a corresponding security vulnerability. Additionally, the example UI 300 indicates whether a remediation procedure is available (e.g., in column 320 in FIG. 3A). Therefore, when a user interacts with a portion of the column 320, an example overlay 350 indicates available remediation procedures for a security vulnerability associated with the portion of the column 320.

As shown in FIG. 3B, the example overlay 350 may include one or more buttons, depending on which remediation procedures are available. In FIG. 3B, button 355 is associated with a code repository, and button 360 is associated with a chat conversation (e.g., as described in connection with FIG. 1C). Furthermore, button 365 is associated with a previous ticket, and button 370 is associated with an automated script (e.g., as described in connection with FIG. 1C). When a remediation procedure is unavailable (e.g., the remediation engine did not receive an indication of a code repository, the remediation engine did not receive an indication of a chat conversation, the remediation engine did not determine a previous ticket, and/or the remediation engine did not generate an automated script), a corresponding button may be omitted or grayed out.

As indicated above, FIGS. 3A-3B are provided as examples. Other examples may differ from what is described with regard to FIGS. 3A-3B.

FIG. 4 is a diagram of an example data structure 400 associated with automated remediation of security vulnerabilities. The data structure 400 may be used by a remediation engine (e.g., when generating a UI for a user device, as described in connection with FIG. 5A). These devices are described in more detail in connection with FIGS. 6 and 7.

As shown in FIG. 4, the example data structure 400 includes a tabular representation of which security vulnerabilities have corresponding remediation procedures. Accordingly, each row (e.g., row 405, row 410, row 415, and row 420 in FIG. 4) is associated with a corresponding security vulnerability. The example data structure 400 includes an identifier (shown as "ID") and a string description (shown as "TITLE") for each security vulnerability. Additionally, a Boolean (shown as "SOLUTION") indicates whether there is a remediation procedure for each security vulnerability (e.g., an indication of a code repository, an indication of a chat conversation, a previous ticket, and/or an automated script). Accordingly, the remediation engine may populate a vulnerability table (e.g., populate column 320, as shown in FIG. 3A) based on the Booleans in the example data structure 400.

As indicated above, FIG. 4 is provided as an example. Other examples may differ from what is described with regard to FIG. 4.

Figure 5A:
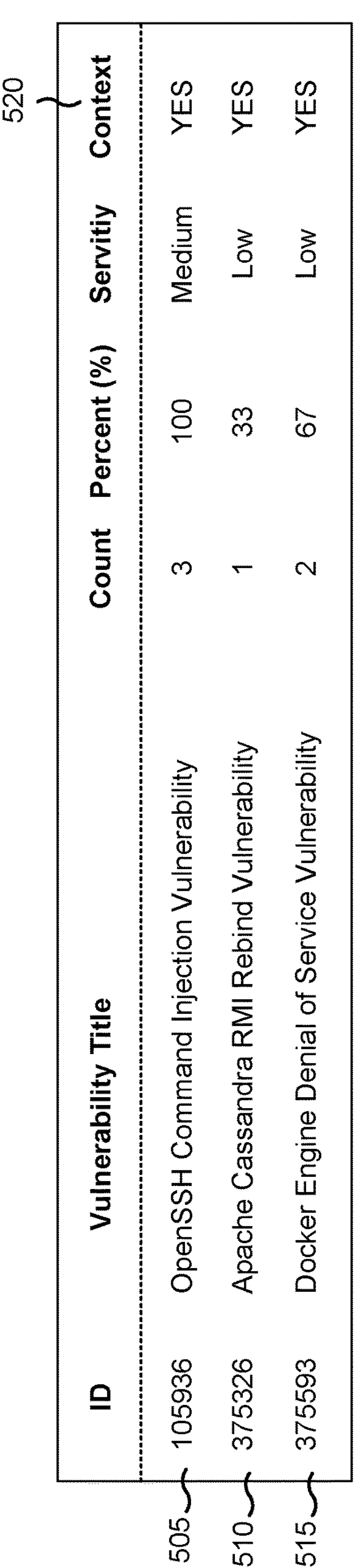

FIGS. 5A and 5B are diagrams of an example UI 500 and an example context table 550, respectively, associated with security vulnerabilities. The example UI 500 and the example context table 550 may be shown by a user device (e.g., based on instructions from a remediation engine). These devices are described in more detail in connection with FIGS. 6 and 7.

As shown in FIG. 5A, the example UI 500 includes a tabular representation of security vulnerabilities. Accordingly, each row (e.g., row 505, row 510, and row 515 in FIG. 5A) is associated with a corresponding security vulnerability. Additionally, the example UI 500 indicates whether context is available (e.g., in column 520 in FIG. 5A). Therefore, when a user interacts with a portion of the column 520, the example context table 550 indicates additional information, such as planned remediation steps and/or performed remediation steps, associated with the security vulnerability associated with the portion of the column 520.

As shown in FIG. 5B, the example context table 550 may include performed remediation steps (shown as "Previous Work & Decisions"), planned remediation steps (shown as "Planned Work & Decisions"), and an amount of time associated with the security vulnerability (shown as "Estimated Time to Remediate (ETR)"). In some implementations, the example context table 550 may also include an identifier (shown as "ID"), an initial datetime (shown as "Date Opened"), and a string description (shown as "Vulnerability Title"), among other examples, for the security vulnerability.

As indicated above, FIGS. 5A-5B are provided as examples. Other examples may differ from what is described with regard to FIGS. 5A-5B.

Figure 6:
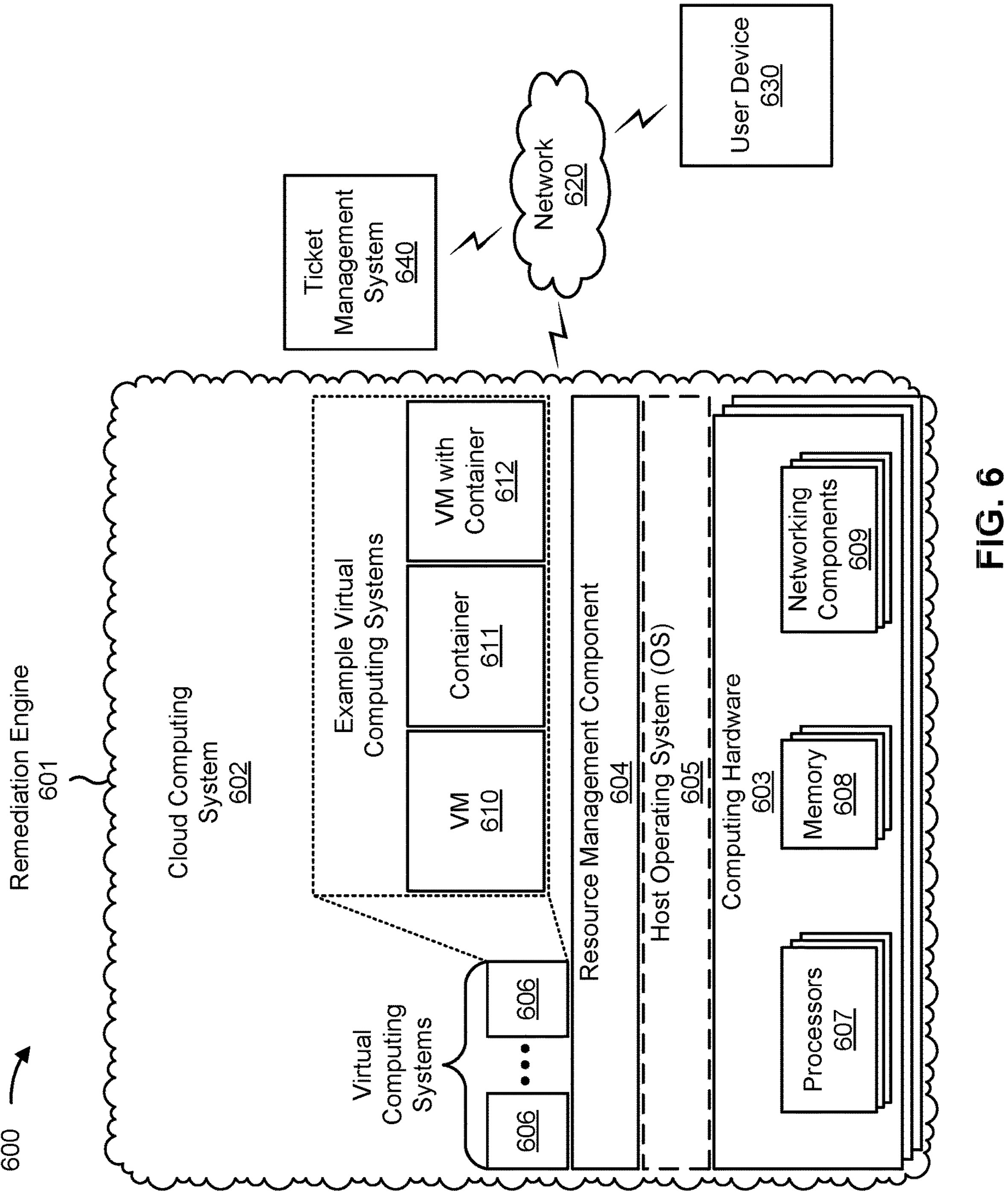
FIG. 6 is a diagram of an example environment in which systems and/or methods described herein may be implemented, in accordance with some embodiments of the present disclosure.

FIG. 6 is a diagram of an example environment 600 in which systems and/or methods described herein may be implemented. As shown in FIG. 6, environment 600 may include a remediation engine 601, which may include one or more elements of and/or may execute within a cloud computing system 602. The cloud computing system 602 may include one or more elements 603-612, as described in more detail below. As further shown in FIG. 6, environment 600 may include a network 620, a user device 630, and/or a ticket management system 640. Devices and/or elements of environment 600 may interconnect via wired connections and/or wireless connections.

The cloud computing system 602 may include computing hardware 603, a resource management component 604, a host operating system (OS) 605, and/or one or more virtual computing systems 606. The cloud computing system 602 may execute on, for example, an Amazon Web Services platform, a Microsoft Azure platform, or a Snowflake platform. The resource management component 604 may perform virtualization (e.g., abstraction) of computing hardware 603 to create the one or more virtual computing systems 606. Using virtualization, the resource management component 604 enables a single computing device (e.g., a computer or a server) to operate like multiple computing devices, such as by creating multiple isolated virtual computing systems 606 from computing hardware 603 of the single computing device. In this way, computing hardware 603 can operate more efficiently, with lower power consumption, higher reliability, higher availability, higher utilization, greater flexibility, and lower cost than using separate computing devices.

The computing hardware 603 may include hardware and corresponding resources from one or more computing devices. For example, computing hardware 603 may include hardware from a single computing device (e.g., a single server) or from multiple computing devices (e.g., multiple servers), such as multiple computing devices in one or more data centers. As shown, computing hardware 603 may include one or more processors 607, one or more memories 608, and/or one or more networking components 609. Examples of a processor, a memory, and a networking component (e.g., a communication component) are described elsewhere herein.

The resource management component 604 may include a virtualization application (e.g., executing on hardware, such as computing hardware 603) capable of virtualizing computing hardware 603 to start, stop, and/or manage one or more virtual computing systems 606. For example, the resource management component 604 may include a hypervisor (e.g., a bare-metal or Type 1 hypervisor, a hosted or Type 2 hypervisor, or another type of hypervisor) or a virtual machine monitor, such as when the virtual computing systems 606 are virtual machines 610. Additionally, or alternatively, the resource management component 604 may include a container manager, such as when the virtual computing systems 606 are containers 611. In some implementations, the resource management component 604 executes within and/or in coordination with a host operating system 605.

A virtual computing system 606 may include a virtual environment that enables cloud-based execution of operations and/or processes described herein using computing hardware 603. As shown, a virtual computing system 606 may include a virtual machine 610, a container 611, or a hybrid environment 612 that includes a virtual machine and a container, among other examples. A virtual computing system 606 may execute one or more applications using a file system that includes binary files, software libraries, and/or other resources required to execute applications on a guest operating system (e.g., within the virtual computing system 606) or the host operating system 605.

Although the remediation engine 601 may include one or more elements 603-612 of the cloud computing system 602, may execute within the cloud computing system 602, and/or may be hosted within the cloud computing system 602, in some implementations, the remediation engine 601 may not be cloud-based (e.g., may be implemented outside of a cloud computing system) or may be partially cloud-based. For example, the remediation engine 601 may include one or more devices that are not part of the cloud computing system 602, such as device 700 of FIG. 7, which may include a standalone server or another type of computing device. The remediation engine 601 may perform one or more operations and/or processes described in more detail elsewhere herein.

The network 620 may include one or more wired and/or wireless networks. For example, the network 620 may include a cellular network, a public land mobile network (PLMN), a local area network (LAN), a wide area network (WAN), a private network, the Internet, and/or a combination of these or other types of networks. The network 620 enables communication among the devices of the environment 600.

The user device 630 may include one or more devices capable of receiving, generating, storing, processing, and/or providing information associated with cloud-based applications, as described elsewhere herein. The user device 630 may include a communication device and/or a computing device. For example, the user device 630 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device. The user device 630 may communicate with one or more other devices of environment 600, as described elsewhere herein.

The ticket management system 640 may include one or more devices capable of receiving, generating, storing, processing, and/or providing information associated with tickets, as described elsewhere herein. The ticket management system 640 may include a communication device and/or a computing device. For example, the ticket management system 640 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The ticket management system 640 may include an issue tracking system, such as Jira or Bugzilla®, among other examples. The ticket management system 640 may communicate with one or more other devices of environment 600, as described elsewhere herein.

The number and arrangement of devices and networks shown in FIG. 6 are provided as an example. In practice, there may be additional devices and/or networks, fewer devices and/or networks, different devices and/or networks, or differently arranged devices and/or networks than those shown in FIG. 6. Furthermore, two or more devices shown in FIG. 6 may be implemented within a single device, or a single device shown in FIG. 6 may be implemented as multiple, distributed devices. Additionally, or alternatively, a set of devices (e.g., one or more devices) of the environment 600 may perform one or more functions described as being performed by another set of devices of the environment 600.

Figure 7:
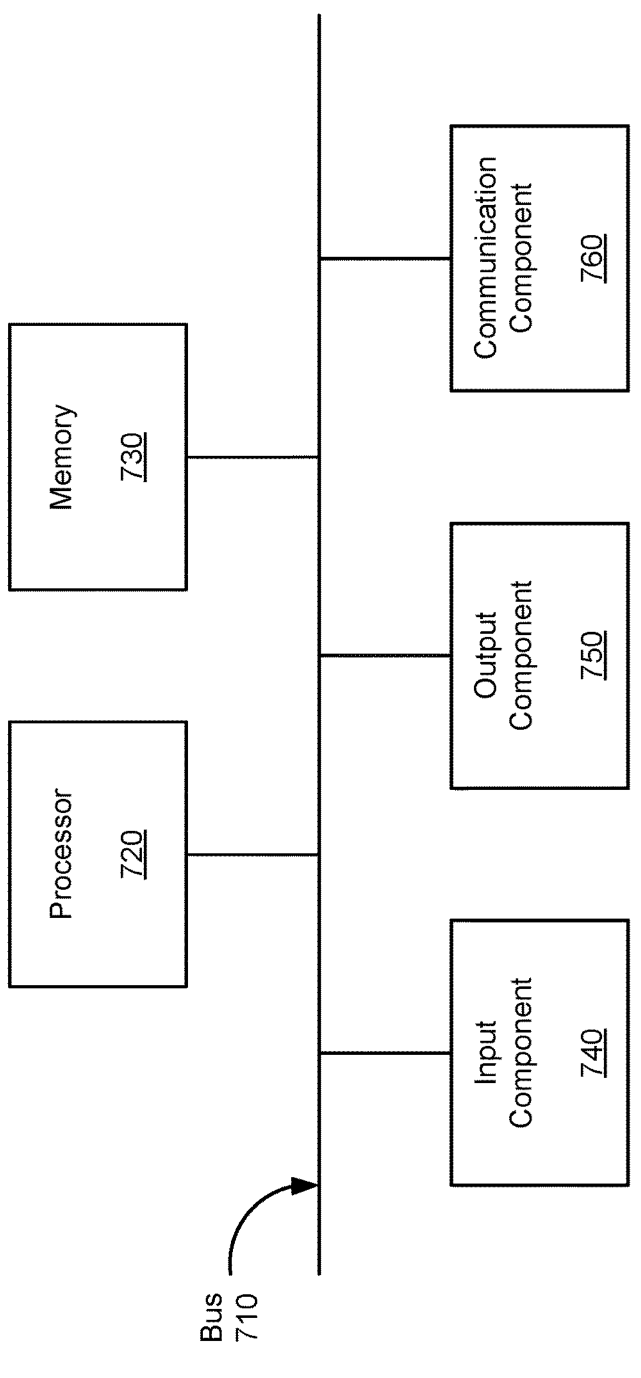
FIG. 7 is a diagram of example components of one or more devices of FIG. 6, in accordance with some embodiments of the present disclosure.

FIG. 7 is a diagram of example components of a device 700 associated with building and providing a remediation library for cloud-based applications. The device 700 may correspond to a user device 630 and/or a ticket management system 640. In some implementations, the user device 630 and/or the ticket management system 640 may include one or more devices 700 and/or one or more components of the device 700. As shown in FIG. 7, the device 700 may include a bus 710, a processor 720, a memory 730, an input component 740, an output component 750, and/or a communication component 760.

The bus 710 may include one or more components that enable wired and/or wireless communication among the components of the device 700. The bus 710 may couple together two or more components of FIG. 7, such as via operative coupling, communicative coupling, electronic coupling, and/or electric coupling. For example, the bus 710 may include an electrical connection (e.g., a wire, a trace, and/or a lead) and/or a wireless bus. The processor 720 may include a central processing unit, a graphics processing unit, a microprocessor, a controller, a microcontroller, a digital signal processor, a field-programmable gate array, an application-specific integrated circuit, and/or another type of processing component. The processor 720 may be implemented in hardware, firmware, or a combination of hardware and software. In some implementations, the processor 720 may include one or more processors capable of being programmed to perform one or more operations or processes described elsewhere herein.

The memory 730 may include volatile and/or nonvolatile memory. For example, the memory 730 may include random access memory (RAM), read only memory (ROM), a hard disk drive, and/or another type of memory (e.g., a flash memory, a magnetic memory, and/or an optical memory). The memory 730 may include internal memory (e.g., RAM, ROM, or a hard disk drive) and/or removable memory (e.g., removable via a universal serial bus connection). The memory 730 may be a non-transitory computer-readable medium. The memory 730 may store information, one or more instructions, and/or software (e.g., one or more software applications) related to the operation of the device 700. In some implementations, the memory 730 may include one or more memories that are coupled (e.g., communicatively coupled) to one or more processors (e.g., processor 720), such as via the bus 710. Communicative coupling between a processor 720 and a memory 730 may enable the processor 720 to read and/or process information stored in the memory 730 and/or to store information in the memory 730.

The input component 740 may enable the device 700 to receive input, such as user input and/or sensed input. For example, the input component 740 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 750 may enable the device 700 to provide output, such as via a display, a speaker, and/or a light-emitting diode. The communication component 760 may enable the device 700 to communicate with other devices via a wired connection and/or a wireless connection. For example, the communication component 760 may include a receiver, a transmitter, a transceiver, a modem, a network interface card, and/or an antenna.

The device 700 may perform one or more operations or processes described herein. For example, a non-transitory computer-readable medium (e.g., memory 730) may store a set of instructions (e.g., one or more instructions or code) for execution by the processor 720. The processor 720 may execute the set of instructions to perform one or more operations or processes described herein. In some implementations, execution of the set of instructions, by one or more processors 720, causes the one or more processors 720 and/or the device 700 to perform one or more operations or processes described herein. In some implementations, hardwired circuitry may be used instead of or in combination with the instructions to perform one or more operations or processes described herein. Additionally, or alternatively, the processor 720 may be configured to perform one or more operations or processes described herein. Thus, implementations described herein are not limited to any specific combination of hardware circuitry and software.

The number and arrangement of components shown in FIG. 7 are provided as an example. The device 700 may include additional components, fewer components, different components, or differently arranged components than those shown in FIG. 7. Additionally, or alternatively, a set of components (e.g., one or more components) of the device 700 may perform one or more functions described as being performed by another set of components of the device 700.

Figure 8:
FIG. 8 is a flowchart of an example process relating to building and providing a remediation library for cloud-based applications, in accordance with some embodiments of the present disclosure.
Figure 8:
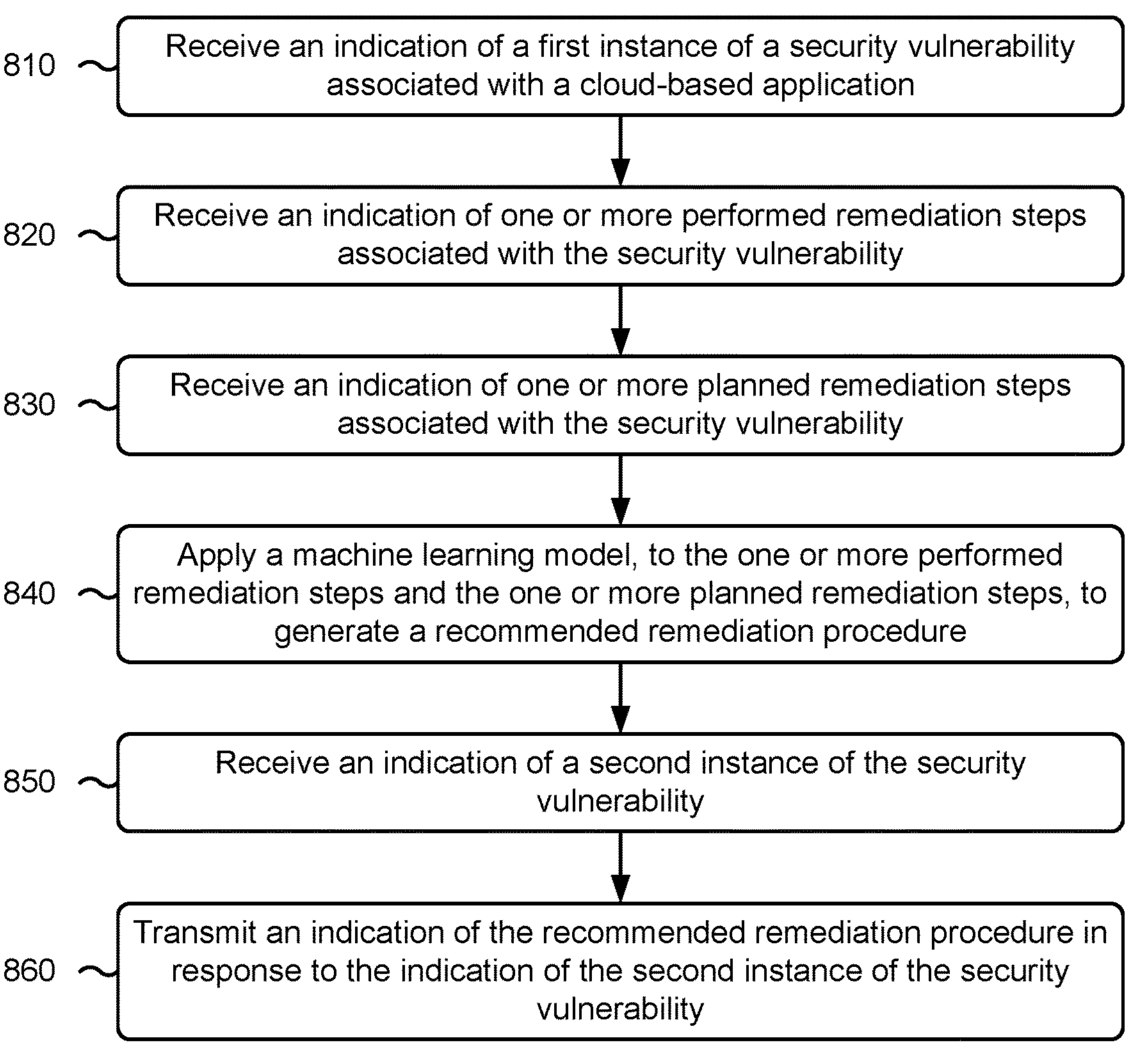

FIG. 8 is a flowchart of an example process 800 associated with building and providing a remediation library for cloud-based applications. In some implementations, one or more process blocks of FIG. 8 may be performed by the remediation engine 601. In some implementations, one or more process blocks of FIG. 8 may be performed by another device or a group of devices separate from or including the remediation engine 601, such as the user device 630 and/or the ticket management system 640. Additionally, or alternatively, one or more process blocks of FIG. 8 may be performed by one or more components of the device 700, such as processor 720, memory 730, input component 740, output component 750, and/or communication component 760.

As shown in FIG. 8, process 800 may include receiving an indication of a first instance of a security vulnerability associated with a cloud-based application (block 810). For example, the remediation engine 601 (e.g., using processor 720, memory 730, input component 740, and/or communication component 760) may receive an indication of a first instance of a security vulnerability associated with a cloud-based application, as described above in connection with reference number 105 of FIG. 1A. As an example, the remediation engine may transmit, and a cloud provider may receive, a request for information. Accordingly, the cloud provider may transmit the indication of the first instance of the security vulnerability in response to the request. Additionally, or alternatively, the remediation engine may subscribe to information updates from the cloud provider. Accordingly, the cloud provider may transmit the indication according to a schedule (e.g., once per hour or once per day, among other examples) and/or as available (e.g., shortly after a change to the cloud-based application is detected). Additionally, or alternatively, the remediation engine may receive the indication of the first instance of the security vulnerability from a cloud database.

As further shown in FIG. 8, process 800 may include receiving an indication of one or more performed remediation steps associated with the security vulnerability (block 820). For example, the remediation engine 601 (e.g., using processor 720, memory 730, input component 740, and/or communication component 760) may receive an indication of one or more performed remediation steps associated with the security vulnerability, as described above in connection with reference number 110 of FIG. 1A. As an example, the remediation engine may transmit, and a user device may receive, a request for information. The user device may transmit the indication of the one or more performed remediation steps in response to the request for information. Additionally, or alternatively, the remediation engine may receive the indication of the one or more performed remediation steps from a ticket management system.

As further shown in FIG. 8, process 800 may include receiving an indication of one or more planned remediation steps associated with the security vulnerability (block 830). For example, the remediation engine 601 (e.g., using processor 720, memory 730, input component 740, and/or communication component 760) may receive an indication of one or more planned remediation steps associated with the security vulnerability, as described above in connection with reference number 110 of FIG. 1A. As an example, the remediation engine may transmit, and a user device may receive, a request for information. The user device may transmit the indication of the one or more planned remediation steps in response to the request for information. Additionally, or alternatively, the remediation engine may receive the indication of the one or more planned remediation steps from a ticket management system.

As further shown in FIG. 8, process 800 may include applying a machine learning model, to the one or more performed remediation steps and the one or more planned remediation steps, to generate a recommended remediation procedure (block 840). For example, the remediation engine 601 (e.g., using processor 720 and/or memory 730) may apply a machine learning model, to the one or more performed remediation steps and the one or more planned remediation steps, to generate a recommended remediation procedure, as described above in connection with reference number 150*a* of FIG. 1C. As an example, the machine learning model may be a clustering model that groups similar security vulnerabilities together. Accordingly, the remediation engine may generate the recommended remediation procedure based on performed remediation steps and/or planned remediation steps for other security vulnerabilities in a same cluster as the security vulnerability.

As further shown in FIG. 8, process 800 may include receiving an indication of a second instance of the security vulnerability (block 850). For example, the remediation engine 601 (e.g., using processor 720, memory 730, input component 740, and/or communication component 760) may receive an indication of a second instance of the security vulnerability, as described above in connection with reference number 155 of FIG. 1D. As an example, the remediation engine may transmit, and a cloud provider may receive, a request for information. Accordingly, the cloud provider may transmit the indication of the second instance of the security vulnerability in response to the request. Additionally, or alternatively, the remediation engine may subscribe to information updates from the cloud provider. Accordingly, the cloud provider may transmit the indication according to a schedule (e.g., once per hour or once per day, among other examples) and/or as available (e.g., shortly after a change to the cloud-based application is detected). Additionally, or alternatively, the remediation engine may receive the indication of the second instance of the security vulnerability from a cloud database.

As further shown in FIG. 8, process 800 may include transmitting an indication of the recommended remediation procedure in response to the indication of the second instance of the security vulnerability (block 860). For example, the remediation engine 601 (e.g., using processor 720, memory 730, and/or communication component 760) may transmit an indication of the recommended remediation procedure in response to the indication of the second instance of the security vulnerability, as described above in connection with reference number 170 of FIG. 1D. As an example, the remediation engine may generate instructions for an overlay (e.g., as described in connection with FIG. 3B). The overlay may indicate the recommended remediation procedure (e.g., optionally with indicating an automated script to perform the recommended remediation procedure).

Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel. The process 800 is an example of one process that may be performed by one or more devices described herein. These one or more devices may perform one or more other processes based on operations described herein, such as the operations described in connection with FIGS. 1A-1E, 2A-2B, 3A-3B, 4, and/or 5A-5B. Moreover, while the process 800 has been described in relation to the devices and components of the preceding figures, the process 800 can be performed using alternative, additional, or fewer devices and/or components. Thus, the process 800 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for automating remediation solutions for cloud-based applications using context-based machine learning, the system comprising:

one or more memories; and one or more processors, communicatively coupled to the one or more memories, configured to:

receive an indication of a first instance of a security vulnerability associated with a cloud-based application;

receive an indication of one or more performed remediation steps associated with the security vulnerability, that have been executed;

receive an indication of one or more planned remediation steps associated with the security vulnerability, that are planned to be executed;

apply a machine learning model, to the one or more performed remediation steps and the one or more planned remediation steps, to generate a recommended remediation procedure;

receive an indication of a second instance of the security vulnerability; and transmit an indication of the recommended remediation procedure in response to the indication of the second instance of the security vulnerability.

2. The system of claim 1, wherein the one or more processors, to apply the machine learning model to generate the recommended remediation procedure, are configured to:

apply the machine learning model to generate an automated script representing the recommended remediation procedure.

3. The system of claim 1, wherein the one or more processors are further configured to:

transmit instructions for a visual representation of the one or more performed remediation steps and the one or more planned remediation steps.

4. The system of claim 3, wherein the one or more processors are further configured to:

transmit instructions for a user interface (UI) indicating the first instance of the security vulnerability; and receive an indication of an interaction with the UI, wherein the instructions for the visual representation are transmitted in response to the indication of the interaction.

5. The system of claim 1, wherein the one or more processors are further configured to:

calculate an amount of time associated with the security vulnerability, wherein the machine learning model is further applied to the amount of time.

6. The system of claim 1, wherein the one or more processors are further configured to:

receive an amount of time associated with the security vulnerability, wherein the machine learning model is further applied to the amount of time.

7. The system of claim 1, wherein the one or more processors are further configured to:

receive an indication of at least one of a chat conversation or a code repository associated with resolving the security vulnerability, wherein the machine learning model is further applied to the indication to generate the recommended remediation procedure, and wherein an output of the machine learning model includes information related to a probability that the at least one of a chat conversation or a code repository resolved a previous instance of a security vulnerability.

8. A method of identifying remediation solutions using machine learning, comprising:

receiving an indication of a current instance of a security vulnerability associated with a cloud-based application;

determining, using a first machine learning model, a previous ticket associated with resolving a previous instance of the security vulnerability, that has been performed;

determining a planned remediation step associated with the security vulnerability, that is planned to be executed;

generating, using a second machine learning model, based on the previous instance and based on the planned remediation step, an automated script associated with resolving the security vulnerability;

transmitting instructions for a user interface (UI) indicating the current instance of the security vulnerability;

receiving an indication of an interaction with the UI; and transmitting instructions for an overlay, indicating the previous ticket and the automated script, in response to the indication of the interaction with the UI.

9. The method of claim 8, further comprising:

receiving an indication of an interaction with the overlay; and triggering execution of the automated script in response to the indication of the interaction with the overlay.

10. The method of claim 8, further comprising:

receiving an indication of an interaction with the overlay; and linking to the previous ticket in response to the indication of the interaction with the overlay.

11. The method of claim 8, further comprising:

receiving, from a ticket management system, a set of tickets associated with the security vulnerability, wherein the previous ticket is selected from the set of tickets.

12. The method of claim 8, further comprising:

receiving an indication of the previous ticket, wherein the first machine learning model validates that the previous ticket resolved the previous instance of the security vulnerability.

13. The method of claim 8, further comprising:

receiving an indication of a chat conversation or a code repository associated with resolving the security vulnerability, wherein the overlay further indicates the chat conversation or the code repository.

14. The method of claim 8, wherein the UI indicates the current instance of the security vulnerability using text.

15. The method of claim 14, wherein the interaction with the UI comprises a click or a tap on the text.

16. A non-transitory computer-readable medium storing a set of instructions for identifying security vulnerabilities for remediation using context-based machine learning, the set of instructions comprising:

one or more instructions that, when executed by one or more processors of a device, cause the device to:

receive an indication of a set of performed remediation steps associated with a set of security vulnerabilities, that have been executed;

receive an indication of a set of planned remediation steps associated with the set of security vulnerabilities, that are planned to be executed;

estimate a set of respective amounts of time associated with the set of security vulnerabilities;

apply a machine learning model, to the set of performed remediation steps, the set of planned remediation steps, and the set of respective amounts of time, to select at least one security vulnerability from the set of security vulnerabilities; and transmit an indication of the at least one security vulnerability.

17. The non-transitory computer-readable medium of claim 16, wherein the indication includes a bounty associated with the at least one security vulnerability.

18. The non-transitory computer-readable medium of claim 17, wherein the one or more instructions, when executed by the one or more processors, further cause the device to:

apply the machine learning model to determine at least one of an amount or a type of the bounty.

19. The non-transitory computer-readable medium of claim 16, wherein the one or more instructions, that cause the device to estimate the set of respective amounts of time, cause the device to:

compare timestamps associated with the set of performed remediation steps to estimate the set of amounts of time.

20. The non-transitory computer-readable medium of claim 16, wherein the one or more instructions, that cause the device to estimate the set of respective amounts of time, cause the device to:

sum estimated amounts of time associated with the set of planned remediation steps to estimate the set of amounts of time.

* * * * *